Aug. 12, 1969　　P. H. CARTER ET AL　　3,460,317
MACHINE FOR APPLYING FILM COVERS TO CONTAINERS
Filed Sept. 3, 1965　　6 Sheets-Sheet 1

INVENTORS
PAUL H. CARTER
THOMAS E. MARION
RAYMOND L. MORSE
WILLIAM DOTY

BY *Albert J. Kramer*
ATTORNEY

Aug. 12, 1969         P. H. CARTER ET AL         3,460,317
           MACHINE FOR APPLYING FILM COVERS TO CONTAINERS
Filed Sept. 3, 1965                                6 Sheets-Sheet 3

INVENTORS
PAUL H. CARTER
THOMAS E. MARION
RAYMOND L. MORSE
WILLIAM DOTY
BY *Albert J. Kramer*
                ATTORNEY Aug. 12, 1969  P. H. CARTER ET AL  3,460,317
MACHINE FOR APPLYING FILM COVERS TO CONTAINERS
Filed Sept. 3, 1965
6 Sheets-Sheet 4
FIG. 5.
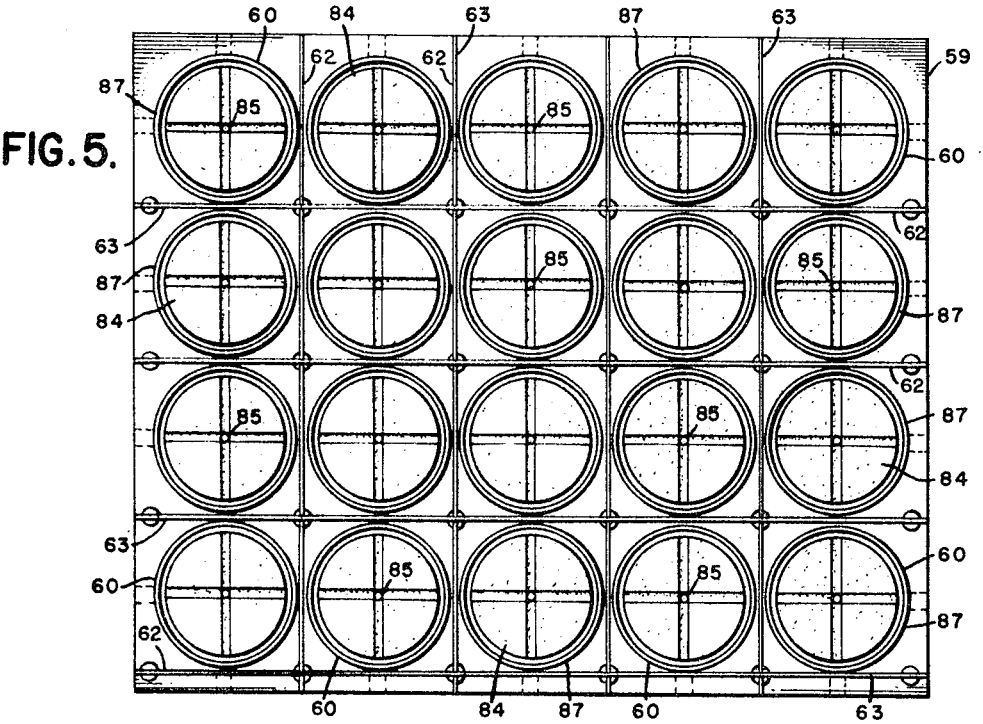
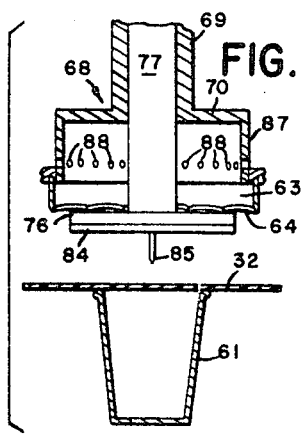
FIG. 9.
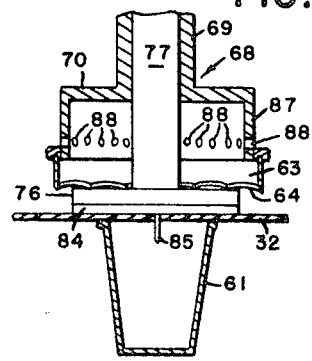
FIG. 10.
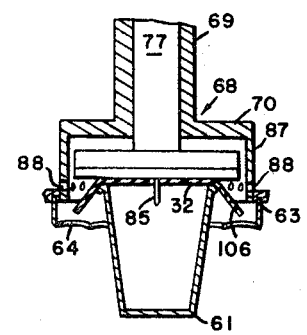
FIG. 11.
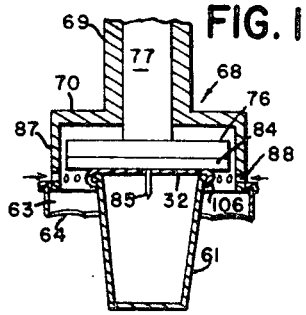
FIG. 12.
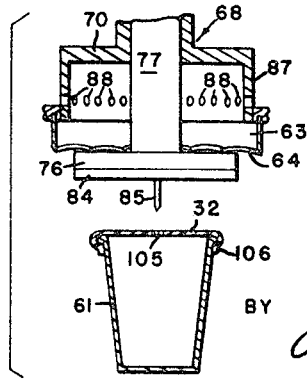
FIG. 13.
*INVENTORS*
PAUL H. CARTER
THOMAS E. MARION
RAYMOND L. MORSE
WILLIAM DOTY
BY Albert J. Kramer
ATTORNEY INVENTORS
PAUL H. CARTER
THOMAS E. MARION
RAYMOND L. MORSE
WILLIAM DOTY
BY Albert J. Kramer
ATTORNEY

INVENTORS
PAUL H. CARTER
THOMAS E. MARION
RAYMOND L. MORSE
WILLIAM DOTY

BY *Albert J. Kramer*

ATTORNEY

United States Patent Office 3,460,317
Patented Aug. 12, 1969

3,460,317
MACHINE FOR APPLYING FILM COVERS TO CONTAINERS
Paul H. Carter, Thomas E. Marion, Raymond L. Morse, and William T. Doty, Baltimore, Md., assignors to Universal Machine Co., Inc., Baltimore, Md., a corporation of Maryland
Filed Sept. 3, 1965, Ser. No. 484,965
Int. Cl. B65b 7/16, 53/06; B67b 5/00
U.S. Cl. 53—329                1 Claim

ABSTRACT OF THE DISCLOSURE

A capping machine of the type which results in a shrink film being applied to the open top of a container is provided having means for puncturing a hole in the film during its placement to vent gases from the container and thereby prevent internal pressure which tends to displace the film. The film is shrunk by a flow of air from an air blower through a conduit overheating elements to the film. The conduit has a damper between the blower and the heating means which is biased to a closed position. The blower is strong enough to generate air pressure sufficient to overcome the damper bias. Thus, when the blower ceases to function, the damper closes under the damper bias and blocks the flow of hot air from the heating means to the blower thus preventing damage to the blower.

---

This invention relates to closure machines, and it is more particularly concerned with improvements in machines for applying a film cover to the open end of containers, such as a paper cup, after filling, so that the container may be carried by a person without spilling its contents or subjecting it to contamination by foreign objects.

An object of the invention is the provision of improvements in such a machine by means of which a closure member is applied in the form of a heat shrinkable film.

Another object is the provision of improvements in a machine of the type mentioned, adapted to the application of such closure members to a large group of containers simultaneously.

Still another object of the invention is the provision of improvements in a machine of the type mentioned, which makes it simple and easy to operate, efficient, sturdy and reliable in use.

These, and still further objects, advantages and features of the invention will be apparent from the following description, considered together with the accompanying drawing.

In the drawing:

FIG. 5 is a bottom plan view of the plate member that carries the cutting knives and which contains apertures in relation to the reciprocating head member hereinafter described.

FIGS. 9, 10, 11, 12, and 13 are a series of schematic views, illustrating a cycle of operation of the embodiment.

Figure 14:
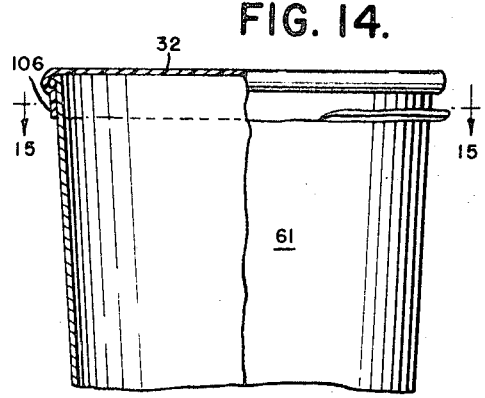

FIG. 14 is an elevational view, partly in section, showing a capped cup.

Figure 15:
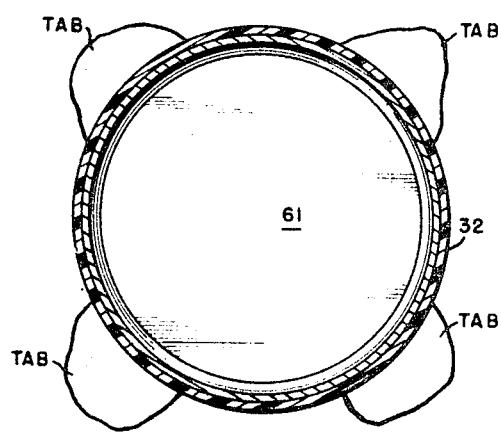
Figure 6:
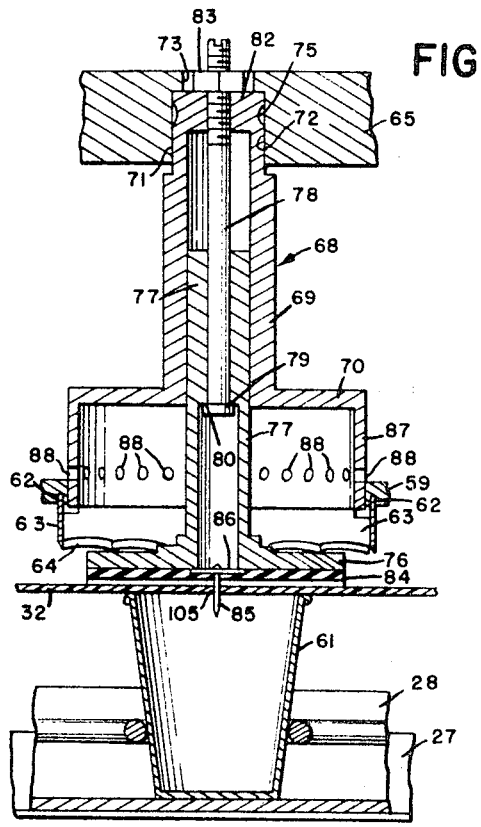
FIG. 6 is a vertical sectional view of a fragmentary portion of the embodiment, illustrating the position of the knives and a head unit in relation to a container to be capped at one step in the cycle of operation.
Figure 7:
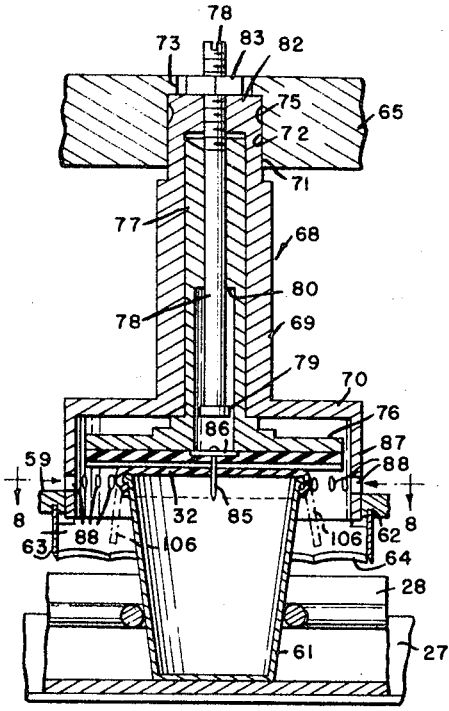
FIG. 7 is a view similar to FIG. 6 at another step in the cycle of operation.
Figure 8:
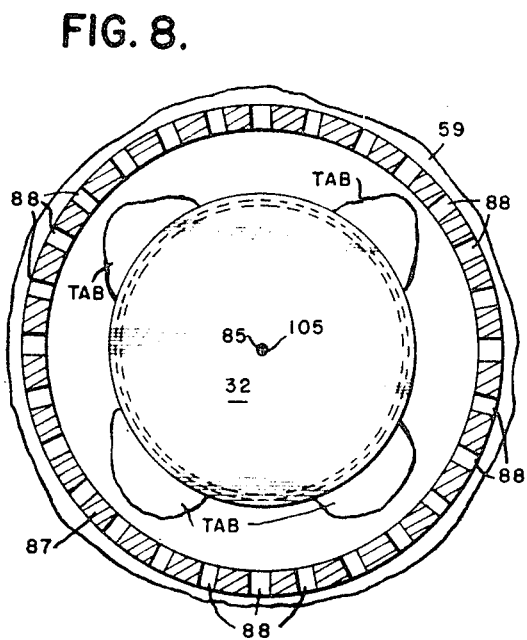
FIG. 8 is a plan sectional view along the line 8—8 of FIG. 7.

FIG. 15 is a section along the line 15—15 of FIG. 14.

Figure 16:
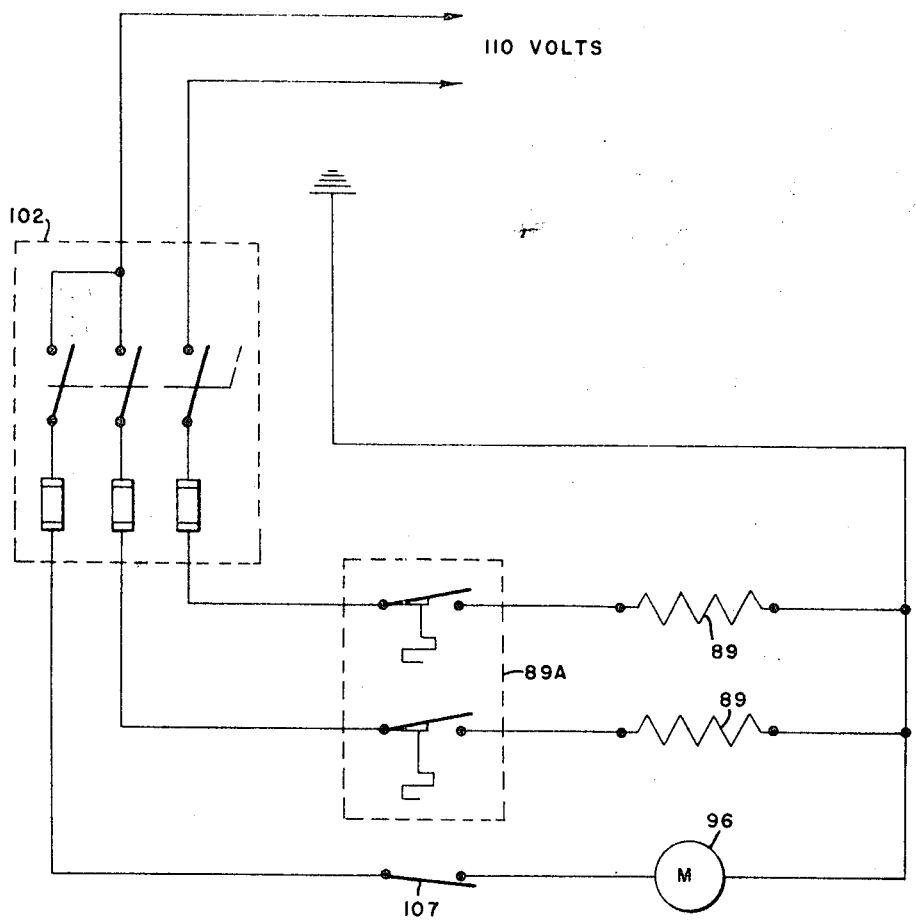

FIG. 16 is an electrical diagram of the electrical parts of the embodiment.

Figure 1:
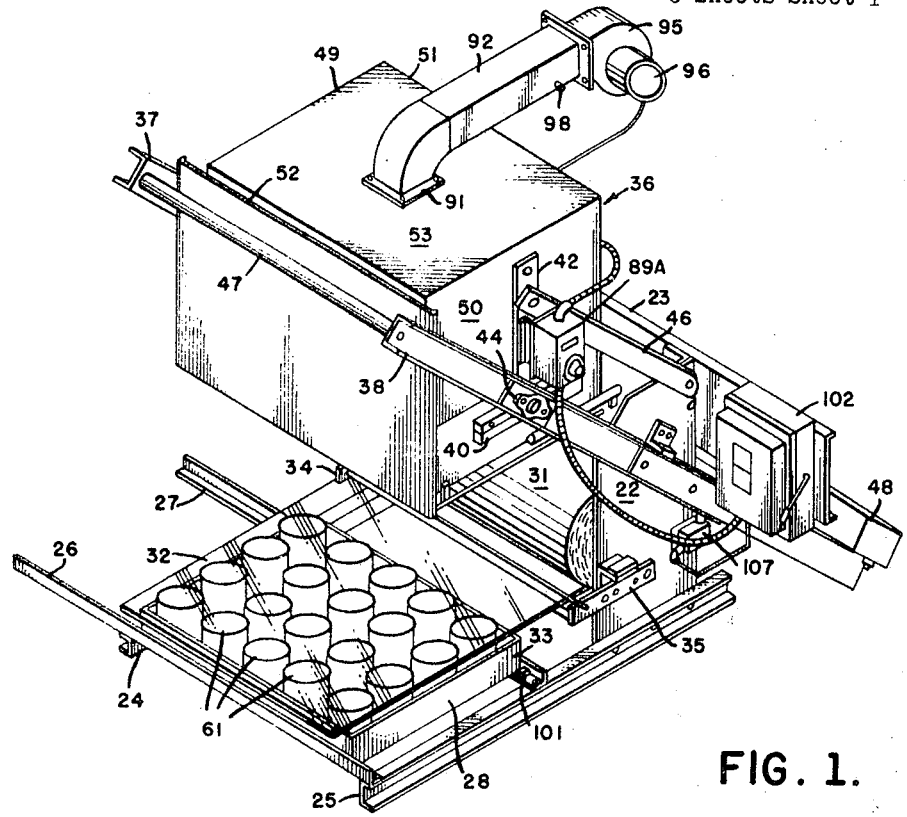
FIG. 1 is a perspective view of an embodiment of the invention, with a group of containers placed in position preparatory to being capped.
Figure 2:
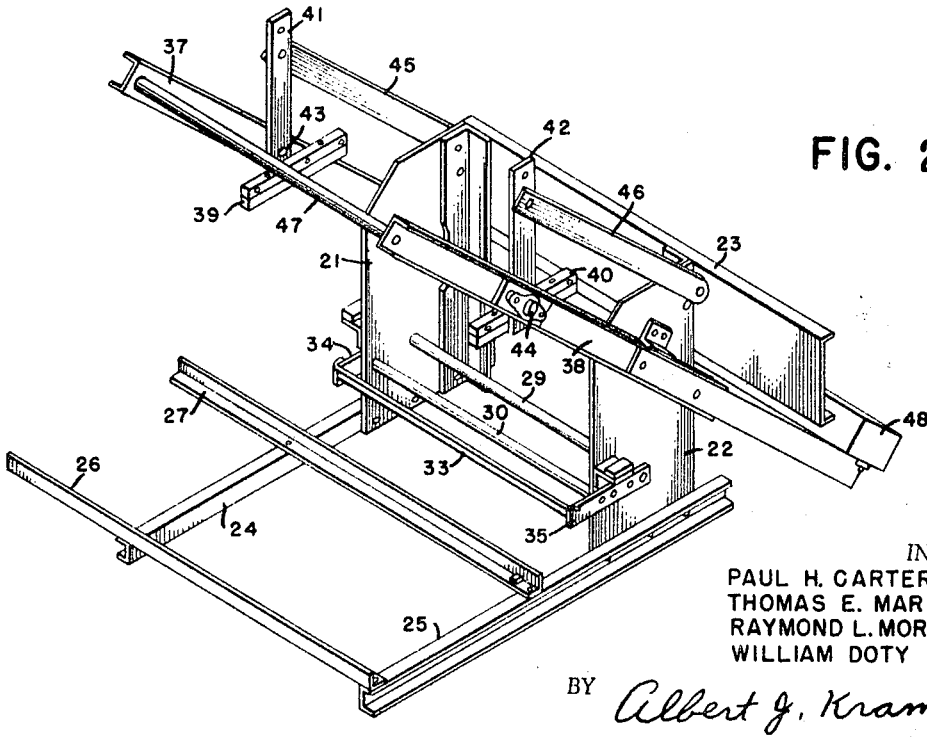
FIG. 2 is a perspective view of the frame and linkage of the embodiment.

Referring with more particularity to the drawing, the embodiment illustrated comprises a frame structure, including a pair of spaced side walls 21 and 22 secured to a back channel beam 23 and mounted on bars 24, 25, respectively. A pair of angle bars 26 and 27 extend across the bars 24 and 25 in spaced relation, forming a guide for the disposition of a tray member 28 in front of the space between the said walls 21 and 22. See FIGS. 1 and 2.

Extending between and secured to the walls 21 and 22 are a pair of parallel spaced cradle rods 29 and 30, adapted to support a roll 31 of conventional heat shrink film 32. A bar 33 is mounted on side wall brackets 34, 35 in front of the cradle rods 29 and 30 to guide the sheet of film 32 as it is manually withdrawn from the roll 31.

A head unit 36 is mounted on the forward ends of a pair of pivoted beams 37 and 38. The unit 36 is pivotally secured to the beams by means of horizontal cleats 39 and 40, secured to vertical links 41 and 42, having trunions 43 and 44 engaging the beams, respectively.

The links 41 and 42 are constrained to a vertical position by means of connecting links 45 and 46 between the links 41 and 42, and the side walls 21 and 22, respectively, completing a pair of parallelogram linkages on either side of the unit.

A handle bar 47 is connected across the front ends of the beams 37 and 38 to facilitate manual movement of the unit. The other ends of the beams extend rearwardly and carry a weight 48 to counterbalance the unit 36.

The unit 36 comprises an upper enclosure section formed of thermally insulated side walls 49 and 50, end walls 51 and 52, a top wall 53, and a lower enclosure section formed of corresponding side members 54 and 55 and end members 56 and 57. These two sections are secured together by bolts 58 or by any other suitable means.

Secured to the bottom of the lower enclosure section is a horizontal plate 59, having a group of openings 60 arranged in a plurality of parallel rows corresponding to the arrangement of containers 61 to be capped as defined by their disposition in the tray 28. Between the openings 60, slots 62 are provided in which strips 63 are adapted to be mounted. The bottom edges of these strips are shaped to a scalloped knife edge 64.

At the top of the lower enclosure a series of parallel mounting bars 65 are secured and supported by wall brackets 66. Each of these bars correspond to a row of apertures 60 in the plate 59 and each bar supports a plurality of units 68 corresponding in number to the apertures of the row. Each unit 68 comprises a hollow stem 69, integral with an inverted cup portion 70 at the bottom.

The upper end of the stem 69 has a reduced portion 71, adapted to fit into a mounting aperture 72 of the bar 65 against an annular abutment 73. The stem is retained in the aperture by means of a spring biased ball latch unit 74 mounted on the bar engaging an annular groove 75 in the recessed portion 71. By these means the unit can be readily removed for repairs and remounted or replaced.

On the interior of the unit 68, a circular plate 76 has an upper hollow neck 77, slidably disposed for vertical reciprocation in the stem 69. A gauge bolt 78 is disposed within the member 77 and has a head 79 at the bottom, adapted to contact an abutment 80 on the interior of the hollow portion of the neck. The upper end of the bolt 78 is threaded and extends upwardly through an opening 81 in the end wall 82 of the stem 69. A nut 83 engages the threaded end of the bolt on the top side of the end wall. By adjusting the position of the nut on this threaded portion the vertical position of the plate member 76 in relation to the cup portion 70 can be varied.

A soft circular pad 84 of rubber, neoprene or other suitable cushion material is secured to the bottom of the plate 76, such as by gluing, and a pin 85 having a flange 86 is held at the center of the plate with the flange between the pad and plate, the pin itself projecting through the pad.

The vertical wall forming a skirt 87 of the cup portion 70 of the unit 68 is provided with a ring of apertures 88 through which heated air flows, as hereinafter more fully explained.

Above the units 68, electrical heating elements 89 are mounted within the space circumscribed by the insulated walls 49, 50, 51, 52 and 53. These elements are electrically connected to thermostats 89A mounted on the wall 50.

Figure 3:
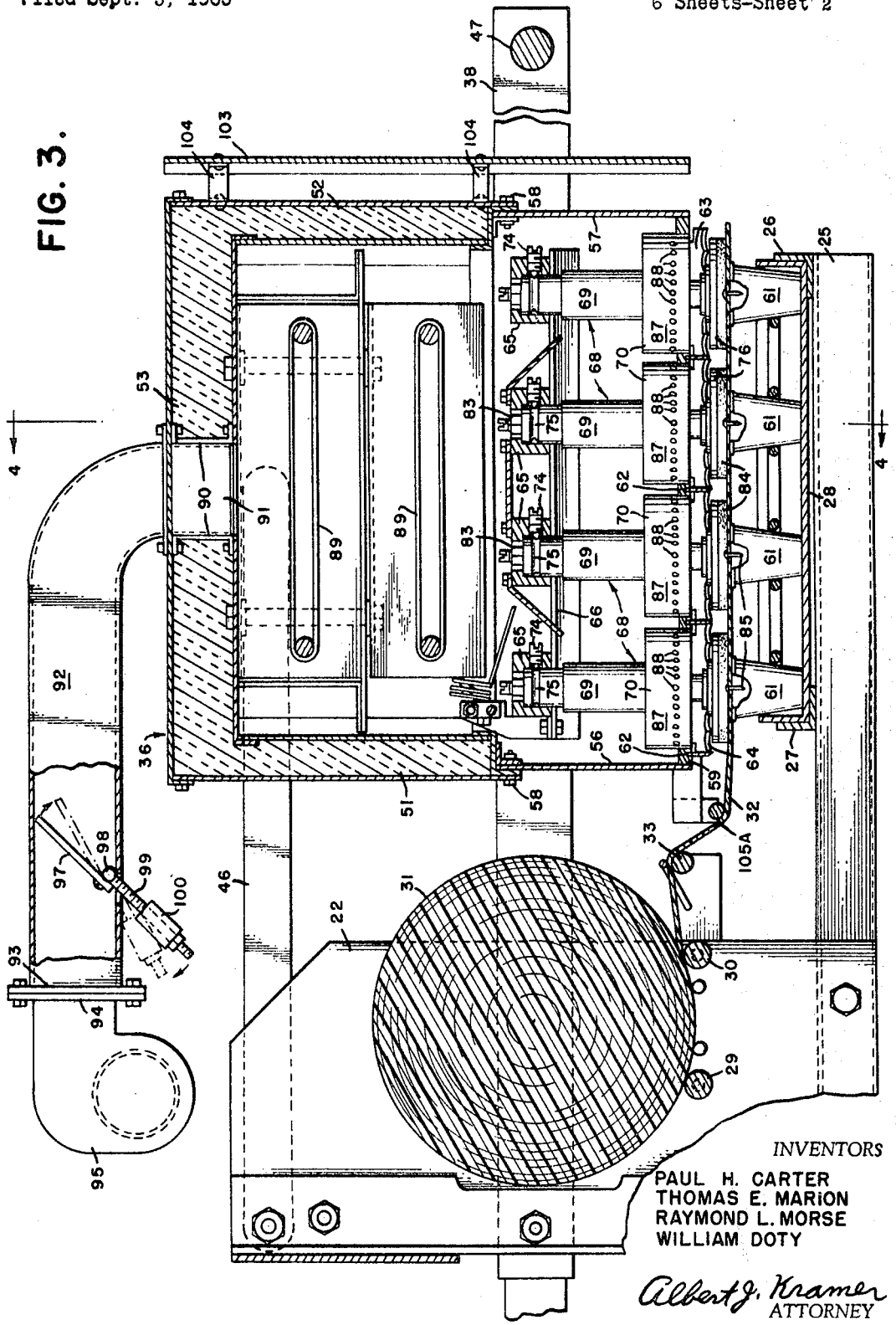
FIG. 3 is a vertical sectional view of the embodiment as shown in FIG. 1.
Figure 4:
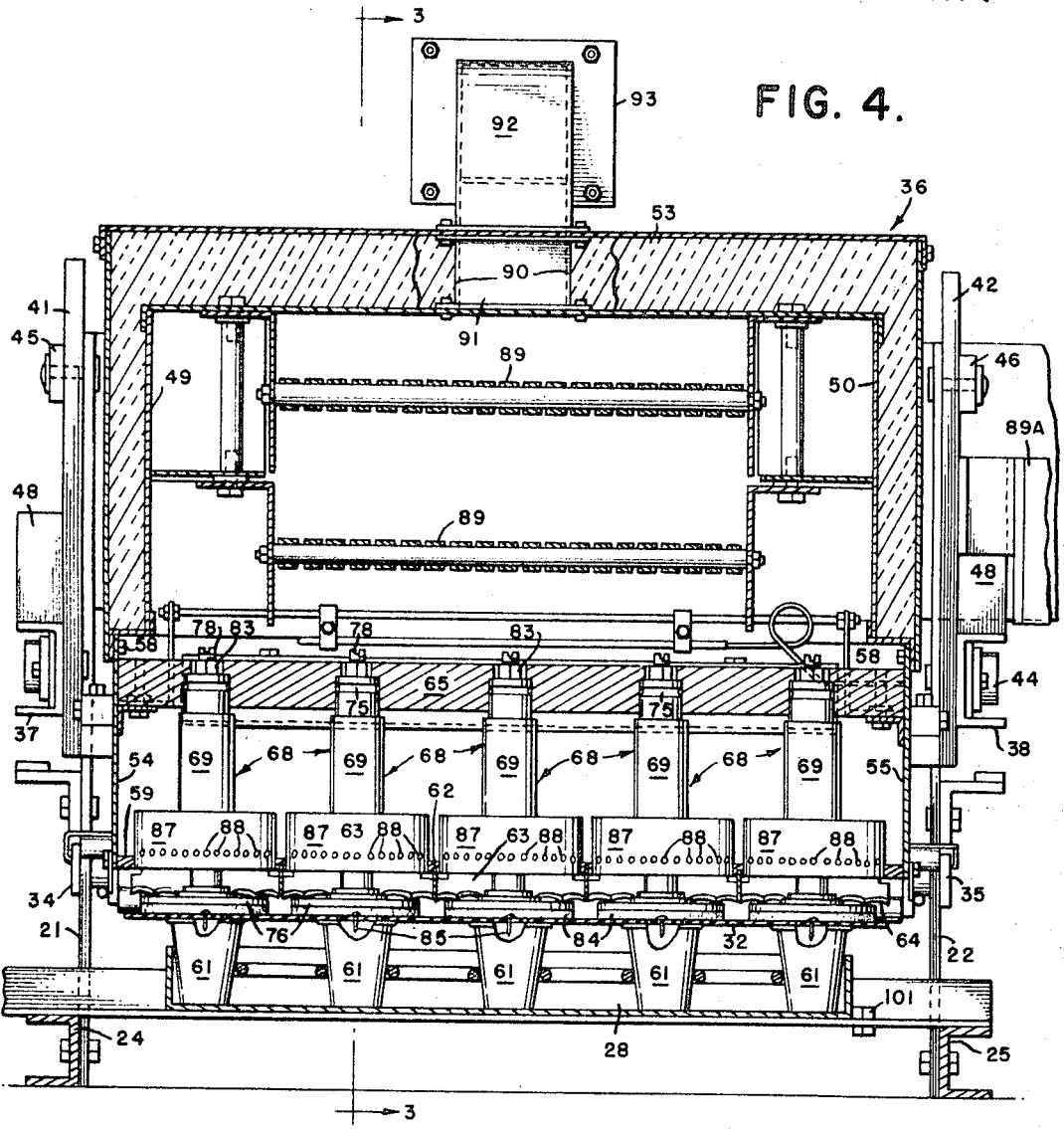
FIG. 4 is a cross-sectional view along the line 4—4 of FIG. 3.

An opening 90 is provided in the top wall 53 in which the vertical outlet end 91 of a conduit 92 is inserted and connected. The inlet end 93 of the conduit is horizontal and it is connected to the outlet end 94 of an air blower 95 which includes an electrical drive motor 96. The conduit 92 is provided with a damper or check valve 97, pivoted on a shaft 98. A threaded arm 99 is connected to the damper and it is provided with a counterweight 100 in threaded engagement therewith. The counterweight is, thus, longitudinally adjustable on the arm 99. Air flowing through the conduit under pressure of the blower opens the damper against the biasing action of the counterweight 100. When the blower ceases to operate the counterweight returns the damper to its initial closed position (see FIG. 3) and thereby blocks the return flow of hot air to the blower 95. This avoids waste of heat and also prevents damage to the air blower from heated air, which would otherwise escape rearwardly into the blower.

In operation, the device is in its initial position, with the head unit 36 in its uppermost position. A tray 28 of filled containers 61 to be capped is disposed on the angle bars 26 and 27 with the end of the tray against abutments 101 which are so placed as to gauge the correct position of the containers in relation to the head member and the plates 76 carried thereby.

The main electrical switch 102 is then closed, which has the effect of energizing the heating elements 89.

The operator then grasps the free end of the film sheet 32 and pulls it over the group of containers 61 (see FIG. 9). Then he pulls the head unit 36 downward by means of the handle bar 47. The effect first is for the pins 85 to puncture the film sheet at the center of each container (see FIG. 10) to form a pinhole 105. The operator continues to pull the unit 36 downward whereupon the knife edges 64 contact the film sheet around the containers and sever sections therefrom that are to form the caps for the containers (see FIG. 11). Continued downward movement of the head unit causes the skirt 87 of each cup portion 70 to turn the marginal edges 106 of the cut film sections down around the rim edge of its corresponding container 61 and to position the apertures 88 alongside these marginal portions. By the time this final position is reached, a limit switch 107, mounted on the side wall 22, is contacted and tripped by the beam 38 which causes the electrical circuit of the motor 96 to be closed. Whereupon, the blower forces air through the damper 97, through the conduit 92, and over the heating elements 89. A hold down bar 105A mounted at the rear of the head unit contacts the film sheet in front of the stationary bar 33 and keeps it in proper position. A heat shield panel 103 is mounted on the wall 52 by brackets 104 to protect the operator. The air, thus, becomes heated and the hot air passes downwardly to escape through the apertures 88. On passing through these apertures the air is directed against the marginal edges 106 of the film surrounding each container. The film is thus caused to shrink against the container which seals it hermetically, except for the pinhole 105. The head unit 36 is then elevated. This causes the limit switch 107 to open, thereby cutting off power to the motor 96. The damper then closes to prevent heated air from backing into the blower. The tray 28 is then removed and replaced by a fresh tray, thereby completing the cycle of operation.

The pinhole 105 in the film prevents the buildup of gas pressure, such as by carbon dioxide escaping from carbonated drinks, that would otherwise tend to unseat the cap. The hole can be made so small, however, as to prevent the escape of liquid splashing around in the containers.

Having thus described our invention, we claim:

1. In a capping machine for applying a film closure to an open top container, said machine comprising a support for the container, means for cutting, shaping and disposing a piece of heat shrinkable film on the container to conform to the open top thereof with marginal edges of the film adjacent a portion of the wall of the container immediately below the open top, said means comprising an annular skirt adapted to surround the upper end of the container, said skirt being perforated for the passage of air, a shank slidably mounted for reciprocation within said skirt, a plate secured to the lower end of said shank of a size to fit inside the skirt, said plate having a cushion pad secured to its bottom, means for forcing air through the perforated skirt against said marginal edges, means for heating the air to a temperature sufficient to cause shrinkage of the film, said heating means comprising heating elements and a conduit, one end of the conduit communicating with the perforated skirt and heating elements and the other end communicating with an air blower, the improvement comprising a pin secured to and movable with the plate and extending below the lower surface of the pad for puncturing underlying portions of the film, a damper in the conduit between the blower and the heating means, said damper being yieldably biased to its closed position, said blower being adapted to generate a flow of air through the conduit under pressure sufficient to overcome the damper bias, whereby when the blower is at rest, the damper closes under its biasing action to block the reverse flow of heated air to the blower.

References Cited

UNITED STATES PATENTS

| | | | |
|---|---|---|---|
| 2,694,517 | 11/1954 | Pennestri | 53—319 |
| 3,354,605 | 11/1967 | Amberg et al. | 53—42 |
| 3,354,604 | 11/1967 | Amberg et al. | 53—42 |

TRAVIS S. McGEHEE, Primary Examiner

U.S. Cl. X.R.

53—42